United States Patent
Maier

(10) Patent No.: US 12,085,040 B2
(45) Date of Patent: Sep. 10, 2024

(54) LARGE INTERNAL COMBUSTION ENGINE

(71) Applicant: AVL List GmbH, Graz (AT)

(72) Inventor: Gerhard Maier, Wagersbach (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 17/910,794

(22) PCT Filed: Mar. 11, 2021

(86) PCT No.: PCT/AT2021/060087
§ 371 (c)(1),
(2) Date: Sep. 9, 2022

(87) PCT Pub. No.: WO2021/179029
PCT Pub. Date: Sep. 16, 2021

(65) Prior Publication Data
US 2023/0111369 A1   Apr. 13, 2023

(30) Foreign Application Priority Data
Mar. 13, 2020   (AT) .............................. A 50213/2020

(51) Int. Cl.
*F02F 7/00* (2006.01)

(52) U.S. Cl.
CPC .......... *F02F 7/0024* (2013.01); *F02F 7/0046* (2013.01); *F02F 7/0082* (2013.01); *F02F 2007/0097* (2013.01)

(58) Field of Classification Search
CPC ...... F02F 7/0024; F02F 7/0046; F02F 7/0082; F02F 2007/0097; F02F 1/004; F02F 7/0021; B23P 19/043
See application file for complete search history.

(56) References Cited

U.S. PATENT DOCUMENTS

| | | | |
|---|---|---|---|
| 3,785,357 A * | 1/1974 | Okazaki | F02F 7/0012 123/1 R |
| 4,843,697 A | 7/1989 | Marshall | |
| 11,224,946 B2 * | 1/2022 | Guisasola | B23P 19/043 |

FOREIGN PATENT DOCUMENTS

| | | |
|---|---|---|
| DE | 19636089 A1 | 3/1997 |
| DE | 102004002196 B3 | 8/2005 |

(Continued)

*Primary Examiner* — Syed O Hasan
(74) *Attorney, Agent, or Firm* — Dykema Gossett PLLC

(57) ABSTRACT

The invention relates to a large internal combustion engine (1) with a crankcase (4), with a crankshaft (11) which is mounted rotatably in said crankcase (4), and with a crankshaft journal (10) on which a connecting rod (9) is pivotably arranged, wherein the crankcase (4) has an upper deck (O) and a lower deck (U) with in each case one opening for the cylinder liner (6), in which opening said cylinder liner (6) is arranged, and wherein the connecting rod (9) has an extent width (A) which is greater than the external diameter (a) of the cylinder liner (6). The problem addressed is that of specifying an improved large internal combustion engine. According to the invention, this is solved by virtue of the fact that the upper deck (O) and/or the lower deck (L') have/has at least one clearance (FO, FU) for the installation of the connecting rod (9), and that the recess which is produced along the external diameter (a) of the cylinder liner (6) opens up at least an extent width (A) of the connecting rod (9) and has a breadth (W) which corresponds at least to a width (b) of the connecting rod (9). Moreover, the invention relates to an associated method for the assembly of the large internal combustion engine (1).

11 Claims, 3 Drawing Sheets

(56) References Cited

FOREIGN PATENT DOCUMENTS

| DE | 102010006958 | A1 |   | 8/2011  |     |          |
|----|--------------|----|---|---------|-----|----------|
| EP | 2818736      | A1 | * | 12/2014 | ... | B23P 19/043 |
| EP | 4074953      | A1 | * | 10/2022 | ... | F02F 1/004 |

* cited by examiner

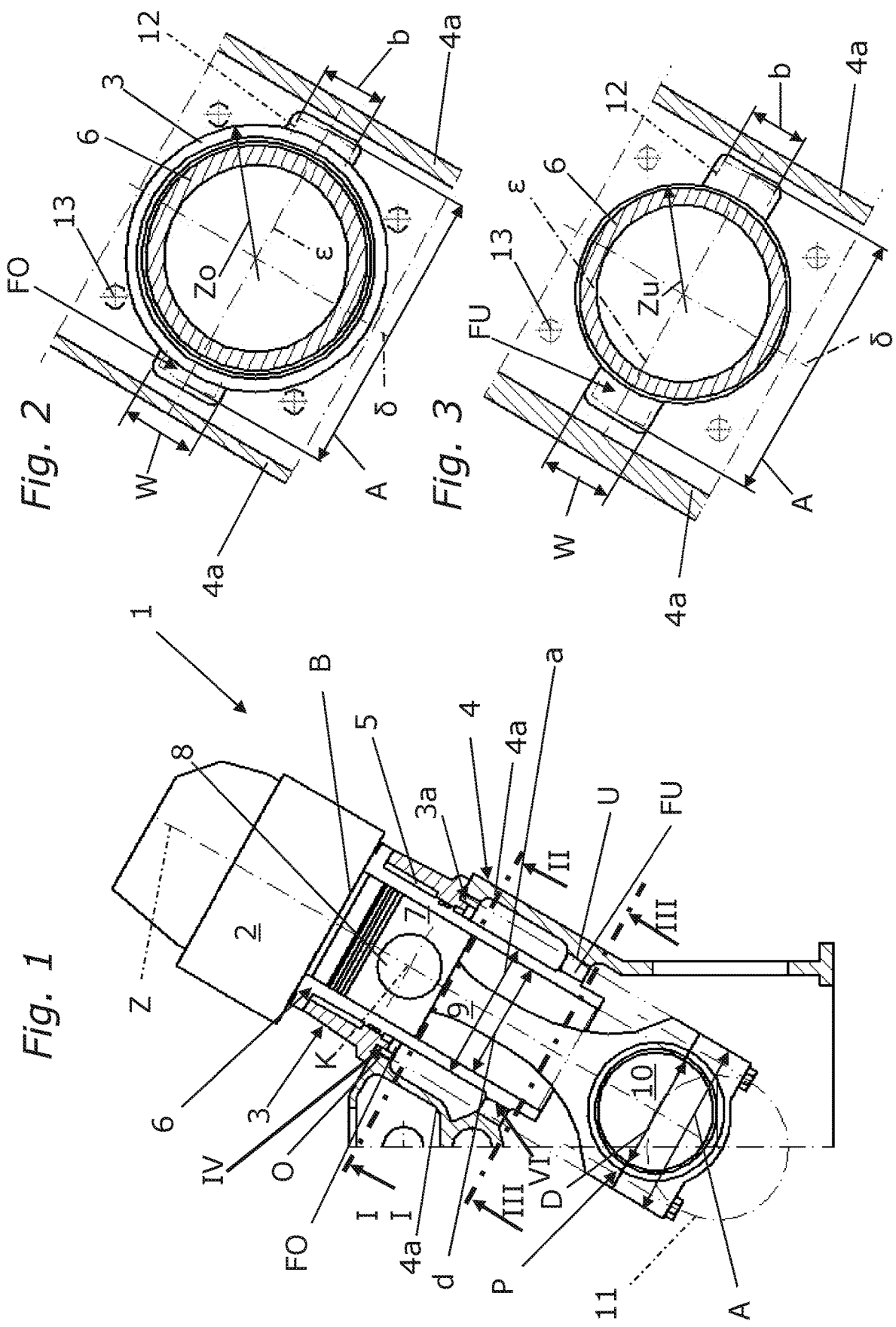

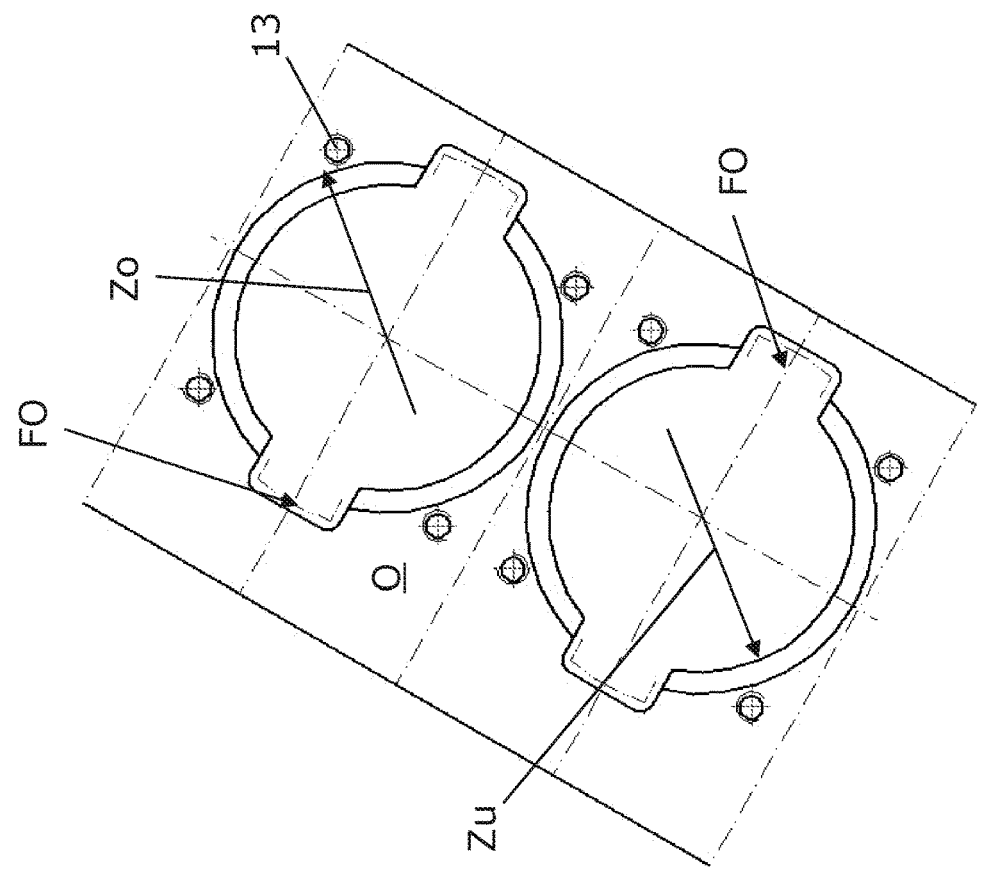
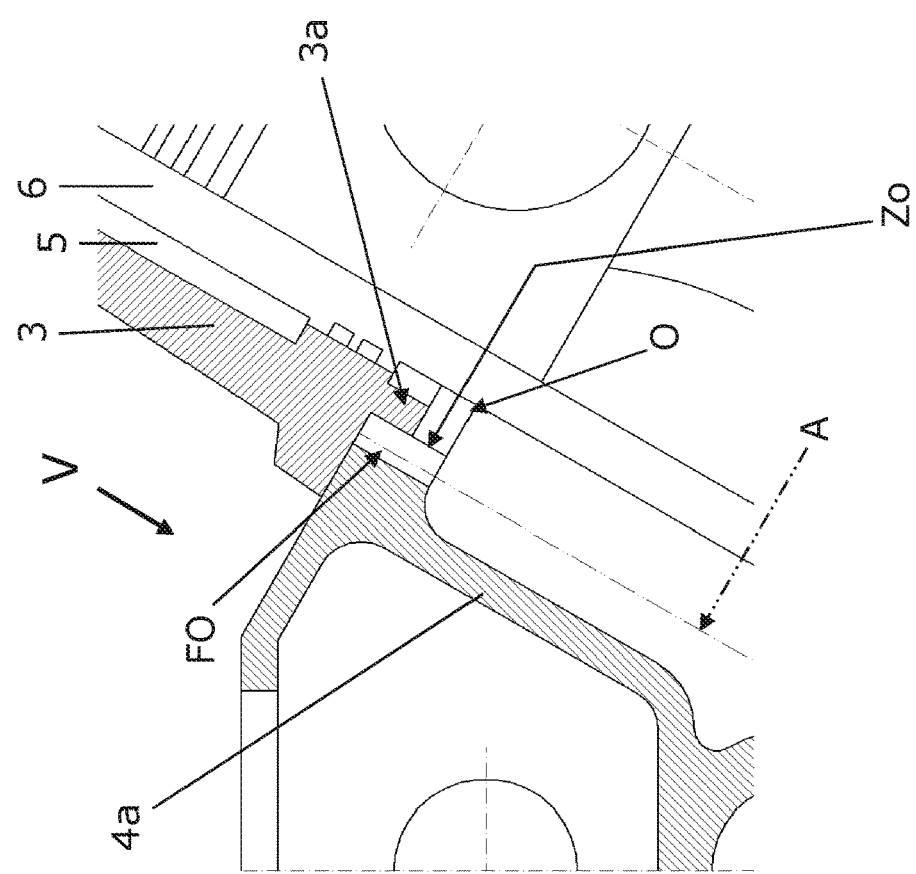

LARGE INTERNAL COMBUSTION ENGINE

CROSS-REFERENCE TO RELATED APPLICATION

This application is a national stage filing based upon International application No. PCT/AT2021/060087, filed 11 Mar. 2021, which claims the benefit of priority to Austria application No. A 50213/2020, filed 13 Mar. 2020.

BRIEF SUMMARY

The invention relates to a large internal combustion engine with a crankcase, with a crankshaft which is rotatably mounted therein, and with a crankshaft journal on which a connecting rod is pivotably arranged, wherein a piston is connected to the connecting rod, which can be displaced back and forth in a cylinder liner, wherein the crankcase has an upper deck and a lower deck with in each case one opening for the cylinder liner in which the said cylinder liner is arranged, and that the connecting rod has an extent width which is greater than an external diameter of the cylinder liner.

In addition, the invention relates to an associated method for mounting such a large internal combustion engine.

BACKGROUND

Large internal combustion engines are internal combustion engines with piston diameters of more than 140 mm, such as for use as marine diesel engines. These are also usually referred to as large engines.

In the case of such large internal combustion engines, special problems and challenges arise due to the greatly increased dimensions compared to internal combustion engines for use in commercial vehicles or in passenger cars.

For required cylinder pressure levels of 300 bar or more, special design points are required in the construction.

Due to the large forces acting as a result of the high combustion pressure and the increased dimensions of the crankshaft journal, the large connecting rod eye must be dimensioned accordingly. The large connecting rod eye is the bearing of the connecting rod on the crankshaft journal.

However, in addition to the forces that occur, the effort required for assembly is also increased. Due to the large dimensions, the weight cannot simply be lifted by hand. Auxiliary equipment is required for assembly.

In large internal combustion engines, the removal of the connecting rod often causes problems due to the locating bore of the cylinder liner. Due to the increasing cylinder pressure, it is necessary to increase the diameter of the crankshaft journals. This also increases the diameter of the large connecting rod eye. However, the enlarged connecting rods can now no longer be easily mounted and dismounted through the locating bore of the cylinder liner in the crankcase.

The locating bores for the cylinder liner cannot be made so large as to allow the connecting rod to pass through, as this would adversely affect the position of cylinder head bolts and unnecessarily increase their distance from the cylinder.

In DE 10 2010 006 958 A1, assembly from below is proposed. However, this is not easily possible due to the tools required. Another disadvantage is that the connecting rod can only be mounted alone and not together with other components in the crankcase. In addition, this is only possible before the crankshaft is inserted and not afterwards.

To replace the connecting rod, therefore, the entire crankshaft has to be removed, which results in considerable additional work and is no longer easy to perform on such large internal combustion engines, as is the case in marine applications.

SUMMARY OF THE INVENTION

It is therefore the object of the present invention to disclose an improved internal combustion engine and an associated simpler method of assembly.

This object is achieved with the present large internal combustion engine according to the invention in that at least the upper deck and/or the lower deck has at least one clearance for mounting the connecting rod, and in that the resulting recess along an external diameter of the cylinder liner opens up at least one extent width of the connecting rod and has a breadth corresponding to at least one width of the connecting rod.

Here, extent width means the greatest extension of the connecting rod in the area of the large connecting rod eye in the plane of the diameter of the crankshaft journal (or in other words in the plane normal to a piston pin pivot axis), which is referred to here as the connecting rod eye plane.

This has the advantage that the connecting rod can simply be installed from above, from the direction of the cylinder head, without the size of the large connecting rod eye being restricted by the installation situation. It is now no longer necessary to remove the crankshaft to remove the connecting rod.

It is irrelevant whether the connecting rod is of symmetrical or asymmetrical design about the connecting rod eye. In the case of symmetrical connecting rods, two identical clearances can be provided on each side of the cylinder axis to simplify production. This makes installation particularly simple and can be achieved without jamming.

As a result, there are clearances in the crankcase over the entire height so that the connecting rod can be inserted and fitted through the opening in the cylinder liner with a larger extent width at the large connecting rod eye than an external diameter of the cylinder liner.

When assembled, the cylinder housing and cylinder liner are not supported by the crankcase at the clearance or clearances.

The at least one clearance in the lower deck or upper deck of the crankcase creates space for easy assembly or disassembly of the connecting rod in the direction of the cylinder axis.

The local clearance of the crankcase on the upper deck and lower deck results in more compact engine dimensions.

In the context of the invention, upper deck is understood here to mean a plane of the crankcase that is the closest deck surface of the crankcase to the cylinder head. The lower deck is a deck located between the upper deck and the crankshaft. Among other things, the upper deck and lower deck perform a static function, namely to hold and support the cylinder liner.

The above design of the large internal combustion engine makes it possible for the connecting rod to be inserted into the crankcase from a side of the crankcase facing away from the crankshaft via an opening for the cylinder liner. This simplifies assembly. Effort, material usage and costs are thus reduced.

The method is particularly advantageous if the connecting rod is inserted into the crankcase along at least one clearance on the upper deck and/or lower deck. This guides the connecting rod to the correct position and facilitates final assembly on the crankshaft.

To facilitate the installation of symmetrical connecting rods, it is advantageously provided in a special embodiment that at least the upper deck for mounting the connecting rod has at least two clearances and/or the lower deck for mounting the connecting rod has at least two clearances which are arranged symmetrically with a plane formed by the cylinder axis and piston pin axis of rotation as a plane of symmetry, and that the resulting recess frees at least one extent width of the connecting rod and has a breadth which corresponds to at least one width of the connecting rod. As a result, jamming during installation can be avoided.

This advantage is further enhanced in particular by the fact that the clearance in the upper deck and the clearance in the lower deck are essentially aligned in the direction of the cylinder axis. In addition, no twisting of the connecting rod is necessary during assembly and can therefore be carried out particularly easily and quickly. The aligned clearances, however, can also be provided independently of the symmetrical arrangement of the clearances.

It is favorable if a cylinder housing has a shoulder which engages in a centering diameter on the upper deck. This makes assembly in the crankcase and individual positioning of the components relative to each other particularly easy to perform and centering simple and reliable.

This effect is enhanced if a locating bore with a centering diameter is also provided on the lower deck to accommodate the cylinder liner.

The cylinder housing forms a water jacket around the cylinder liner. The upper deck has a support surface for the cylinder housing for the resulting water jacket. The upper deck thus also performs the function of centering the cylinder housing in the crankcase.

To increase the rigidity of the crankcase, the uppermost boundary surface of the crankcase, the upper deck, is of reinforced design. It is particularly advantageous if the wall thickness around the opening for the cylinder liner is increased.

A particularly advantageous embodiment provides that the at least one clearance is designed as a passage for oil mist separation.

In a particularly favorable design of the invention, at least the cylinder liner, piston and connecting rod are designed to be pre-assembled to form a first unit in order to save time and effort.

This advantage is even increased if a cylinder head and a cylinder housing with cylinder liner, piston and connecting rod are designed to be pre-assembled to form the first unit. This is possible due to the special design of the components. As a result, a first unit can thus be assembled as a cylinder unit and placed together in the crankcase. Alternatively, only the cylinder head, cylinder liner, connecting rod and piston can be pre-assembled.

For this purpose, the favorable method is designed in such a way that the connecting rod is bolted to the cylinder liner and the piston to form a first unit before being mounted on the crankshaft and is connected together with the crankcase, and that preferably a cylinder housing and preferably a cylinder head are connected to the first unit before being connected to the crankcase.

BRIEF DESCRIPTION OF THE DRAWING

In further detail, the invention is explained with reference to the non-limiting exemplary embodiment shown in the figures, wherein:

FIG. 1 shows a large internal combustion engine according to the invention in a sectional schematic view;

FIG. 2 shows a section along line II-II according to FIG. 1;

FIG. 3 shows a section along line III-III according to FIG. 1;

FIG. 4 shows a detail IV according to FIG. 1;

FIG. 5 shows a view according to arrow V in FIG. 4; and

DETAILED DESCRIPTION

Figure 6:
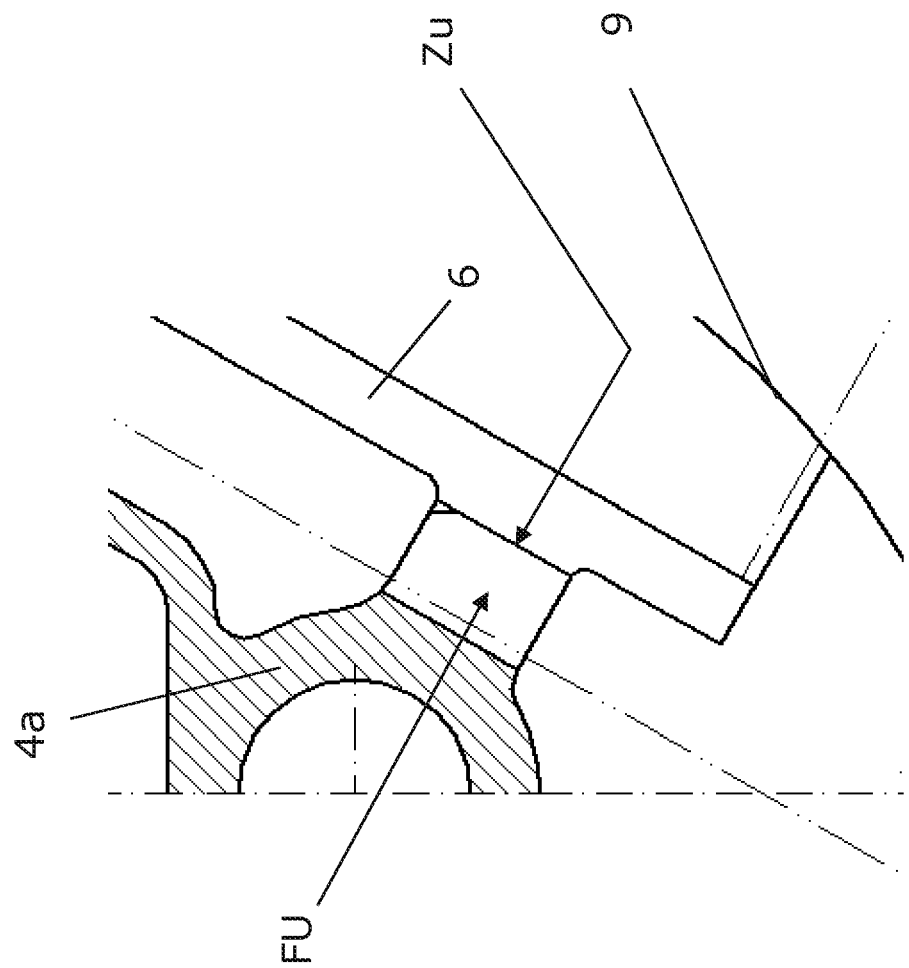
FIG. 6 shows a detail VI according to FIG. 1.

FIG. 1 shows a large internal combustion engine 1. The components of the large internal combustion engine 1 visible from the outside are a cylinder head 2, a cylinder housing 3 and a crankcase 4.

The cylinder housing 3 forms a water jacket 5 around a cylinder liner 6. In this embodiment shown, the cylinder housing 3 supports the cylinder liner 6 and thus also the cylinder head 2 relative to the crankcase 4. For this purpose, the cylinder housing 3 rests against an upper deck O. The cylinder liner 6 is arranged in an opening of the crankcase 3, wherein an external diameter of the opening and thus of the cylinder liner 6 is denoted by a. An inner diameter of the cylinder liner 6 is denoted by d.

A lower deck U is a deck placed deeper in the crankcase 4 with an increased wall thickness compared with other boundary walls 4a of the crankcase 4 to increase the rigidity of the crankcase 4. The lower deck U is arranged in an area located in the vicinity of an end of the cylinder liner 6 facing away from the cylinder head 2. The lower deck U serves to accommodate this lower region of the cylinder liner 6. In addition, slugs for cylinder head bolts 13 (see FIG. 2 to FIG. 4) can also be incorporated.

The crankcase 4 has cast walls as boundary walls 4a, via which the upper deck O and the lower deck U are connected to each other. The bolt forces originating from the cylinder head bolts 13 are introduced into the entire structure of the crankcase 4 via the upper deck O, boundary walls 4a and possibly via the lower deck U.

A combustion chamber B is enclosed by cylinder liner 6, cylinder head 2 and by a piston 7 which is displaceable in the cylinder liner 6. An ignitable mixture is combusted explosively within the combustion chamber B, causing the piston 7 to move away from the cylinder head 2.

The piston 7 is pivotably connected to a connecting rod 9 via a piston pin 8. This connecting rod 9 is in turn pivotably mounted on a crankshaft journal 10 of a crankshaft 11 rotatably mounted in the crankcase 4. The crankshaft 11 is only indicated by dashed dots for better visibility. The bearing with which connecting rod 9 is coupled to crankshaft 11 is referred to as large connecting rod eye P.

In large internal combustion engines with ignition pressures of 250 bar to 300 bar, diameters D of the crankshaft journal 10 of around 90% to 100% of the inside diameter d of the cylinder liner 6 or the opening of the crankcase 4 are required.

Straight split connecting rods 9 become too wide as a result of this circumstance for the connecting rod 9 or a connecting rod upper part, which is arranged between the crankshaft 11 and piston 7 in the assembled state, to be inserted through the opening for the cylinder liner 6 or to be dismounted from it again.

Split connecting rods 9 in particular have an advantage over inclined connecting rods 9 because of their more controllable situation in the pitch plane due to toothing geometries, although inclined connecting rods 9 can have advantages in terms of an extent width A.

The extent width A designates the greatest extension of the connecting rod 9 in the area of the large connecting rod eye P in the plane of the diameter D of the crankshaft journal 10, the connecting rod eye plane ε. The connecting rod eye plane & corresponds to a plane normal to a piston pin axis of rotation K.

To facilitate installation from above, a clearance FO is provided in the upper deck O symmetrically about a plane δ defined by the cylinder axis Z and the piston pin axis of rotation K. A clearance FU has also been designed in the lower deck U in each case symmetrically around this plane δ.

A locating bore with a centering diameter Zo is provided in the upper deck O for the cylinder housing 3. This forms a shoulder 3a in the area of the clearances FO, and engages in the centering diameter Zo in the area of the opening on the upper deck O, see in particular FIG. 4 and FIG. 5.

In the lower deck U, there is advantageously a centering diameter Zu for centering the cylinder liner 6, see FIG. 5 and FIG. 6.

In both advantageous concepts of dividing the connecting rods 9—whether straight or inclined division—a local clearance FO, FU of the cover planes O, U of the crankcase 4 brings improvements in the assembly and disassembly of the connecting rod 9.

It is also possible to assemble a first unit together. This first unit consists here of connecting rod top 9, piston 7, cylinder liner 6 and cylinder head 2 with water jacket and possibly even cylinder housing 3 with water jacket 5.

According to an advantageous design of the method according to the invention, this first unit is pre-assembled and inserted into the crankcase 4 from above in the direction of the cylinder head 2.

The first unit is guided along the opening for the cylinder liner 6, first through the upper deck O and then through the lower deck U. The connecting rod 9 in the area of the large connecting rod eye P is indicated by the dot-dash line with reference sign 12. A width b of the connecting rod 9 and the extent width A are each slightly smaller than the area cleared by the clearance FO in the upper deck O and by the clearance FU in the lower deck U. The clearance FO and the clearance FU have a breadth W that is in each case about one fifth larger than the width b of the connecting rod 9.

In the large internal combustion engine 1 shown, the clearances FO and FU are thereby constructed approximately around the contour 12 of the connecting rod 9, so that there is a normal distance between the opening and the contour 12 of the connecting rod 9, which corresponds to approximately 20% of the width b of the connecting rod 9.

FIG. 2 shows a section in the area of the upper clearance FO. Here, the centering diameter Zo is visible as the outermost diameter in the upper deck O within the boundary walls 4a of the crankcase 4. Radially within the centering diameter Zo, a first surface and a second surface on the cylinder housing 3 and a surface on the cylinder liner 6 as well as an intersection of the cylinder liner 6 with the centering diameter Zo are arranged in succession.

The radially outer surface of the cylinder housing 3, which has approximately the centering diameter Zo on the outside (manufacturing tolerances), represents the surface to the crankshaft 11 of the shoulder 3a of the cylinder housing 3. The piston 7—not shown here—is arranged in the center around the cylinder axis Z.

Around the recess for the cylinder housing 3, the positions of the cylinder head bolts 13 are shown on the upper deck O.

FIG. 3 shows a view of the lower deck U from the crankshaft 11. Two lower clearances FU are arranged symmetrically around the plane o. The locating bore for the cylinder liner 6 has the centering diameter Zu. The cylinder liner 6 is arranged radially within the centering diameter Zu. The piston 7, which is not shown in detail here, is arranged inside the cylinder liner 6.

FIG. 2 and FIG. 3 clearly show the breadth W of the upper clearance FO and the lower clearance FU, respectively. In the embodiment shown, the two breadths W are the same. In alternative embodiments, a different breadth W is possible for the different clearances.

The connecting rod 9 has a width b and an extent width A, wherein the connecting rod 9 is only indicated by dashed dots.

FIG. 4 shows a detail according to arrow IV in FIG. 1. The detail shows the boundary walls 4a of the crankcase 4 and the upper deck O with the upper clearance FO. Inside the centering diameter Zo, the shoulder 3a of the cylinder housing 3 is arranged. In the direction of the cylinder axis Z, the cylinder liner 6 adjoins the cylinder housing 3. A water jacket 5 is formed between cylinder housing 3 and cylinder liner 6.

FIG. 5 shows the upper deck O and the visible openings—upper clearance FO and aligned lower clearance FU as well as the centering diameter Zo and the centering diameter Zu. It can be seen that the upper centering diameter Zo is larger than the lower centering diameter Zu.

FIG. 6 shows, analogously to FIG. 4, a detail according to arrow VI in FIG. 1. Again visible are the crankcase 4a and the lower deck U with the lower clearance FU and the cylinder liner 6 within the lower centering diameter Zu. The contour of the connecting rod 9 is only slightly indicated.

In an alternative embodiment, the two clearances FO and FU can be slightly twisted into an aligned embodiment for design reasons. In this case, the least possible twisting is preferred. For assembly, the connecting rod 9 is first guided through the upper clearance FO, then twisted and guided through the lower clearance FU. Finally, it may be necessary to twist the connecting rod 9 again in the connecting rod eye plane ε.

The invention claimed is:

1. An internal combustion engine comprising:
   a crankcase;
   a crankshaft rotatably mounted within the crankcase;
   at least one connecting rod;
   a crankshaft journal on which the at least one connecting rod is pivotably arranged;
   a cylinder liner;
   a piston is connected to the at least one connecting rod, the piston is configured and arranged to be displaced back and forth in the cylinder liner;
   wherein the crankcase has an upper deck and a lower deck, each with one opening arranged to receive the cylinder liner, and in that the at least one connecting rod has an extent width which is greater than an outside diameter of the cylinder liner;
   wherein at least the upper deck and the lower deck are configured and arranged for mounting the connecting rod, and wherein the upper deck has at least two clearances and the lower deck has at least two clearances, wherein each of the upper deck clearances and lower deck clearances are arranged symmetrically about a plane that extends along a longitudinal axis of the cylinder, and in that the resulting recess clears the at least one extent width of the at least one connecting rod and has a breadth which corresponds to the at least one width of the at least one connecting rod.

2. The internal combustion engine according to claim 1, wherein the clearance in the upper deck and the clearance in the lower deck are arranged substantially aligned in the direction of a cylinder axis.

3. The internal combustion engine according to claim 1, further including a cylinder housing having a shoulder that engages a centering diameter on the upper deck.

4. The internal combustion engine according to claim 1, wherein the at least one clearance is configured and arranged as a passage for oil mist separation.

5. The internal combustion engine according to claim 1, wherein the-cylinder liner, the piston and the at least one connecting rod are configured and arranged to be pre-assembled to form a first unit.

6. The internal combustion engine 1 according to claim 5, further including a cylinder head and a cylinder housing with the cylinder liner, wherein the cylinder head and the cylinder housing with the cylinder liner, piston and at least one connecting rod are configured and arranged to be pre-assembled to form the first unit.

7. Method for mounting an internal combustion engine according to claim 1, characterized in that the at least one connecting rod is introduced into the crankcase from a side of the crankcase facing away from the crankshaft via an opening for the cylinder liner, wherein the at least one connecting rod is introduced into the crankcase along at least one clearance at the upper deck and/or lower deck.

8. The method according to claim 7, wherein the at least one connecting rod is configured and arranged to be moved along the clearance during insertion into the crankcase,
wherein at least one clearance at at least the upper deck or lower deck is twisted relative to a connecting rod eye plane and the at least one connecting rod is twisted relative to the final connecting rod eye plane for insertion.

9. The method according to claim 7, wherein the at least one connecting rod is screwed together with the cylinder liner and the piston to form a first unit before being mounted on the crankshaft and is connected together with the crankcase.

10. The method according to claim 9, wherein a cylinder housing is connected to the first unit prior to the connection to the crankcase.

11. The method according to claim 10, wherein a cylinder head is connected to the first unit prior to the connection to the crankcase.

\* \* \* \* \*